US012368705B2

(12) United States Patent
Zihnioglu

(10) Patent No.: US 12,368,705 B2
(45) Date of Patent: Jul. 22, 2025

(54) PROXY DIRECT CONNECT

(71) Applicant: Webshare Software Company, Reading, CA (US)

(72) Inventor: Asim Utku Zihnioglu, Reading, CA (US)

(73) Assignee: Webshare Software Company, Covina, CA (US)

( * ) Notice: Subject to any disclaimer, the term of this patent is extended or adjusted under 35 U.S.C. 154(b) by 289 days.

(21) Appl. No.: 17/719,864

(22) Filed: Apr. 13, 2022

(65) Prior Publication Data

US 2023/0336542 A1 Oct. 19, 2023

(51) Int. Cl.
*H04L 9/40* (2022.01)
(52) U.S. Cl.
CPC ........ *H04L 63/083* (2013.01); *H04L 63/0236* (2013.01); *H04L 63/0281* (2013.01); *H04L 63/20* (2013.01)
(58) Field of Classification Search
CPC ..... H04L 67/10; H04L 63/0281; H04L 67/56; H04L 67/02; H04L 51/046; H04L 63/20; H04L 67/568; H04L 65/1096; H04L 65/403; H04L 67/563; H04L 67/01; H04L 67/561; H04L 41/22; H04L 63/102; H04L 67/306; H04L 63/08; H04L 63/10; H04L 65/1045; H04L 65/401; H04L 65/65; H04L 43/50; H04L 63/0428; H04L 12/1859; H04L 51/04; H04L 51/08; H04L 51/216; H04L 65/1063; H04L 67/535; H04L 63/0876; H04L 12/66; H04L 12/2818; H04L 67/125; H04L 63/02; H04L 67/141; H04L 65/1101; H04L 12/2803; H04L 65/102; H04L 67/51; H04L 63/0272;

(Continued)

(56) References Cited

U.S. PATENT DOCUMENTS

2007/0286160 A1* 12/2007 Gorti ..................... H04W 4/029
370/352
2010/0135279 A1* 6/2010 Petersson ............ H04L 65/1036
370/401

(Continued)

*Primary Examiner* — Djenane M Bayard
(74) *Attorney, Agent, or Firm* — Hickman Becker Bingham Ledesma LLP

(57) ABSTRACT

In some implementations, a computer-implemented method comprises: receiving, by a proxy server, from a residential endpoint proxy, an endpoint request to confirm user credentials for authenticating a communications connection between a source host and the residential endpoint proxy; determining based on the endpoint request, whether the user credentials for authenticating a communications connection between a source host and the residential endpoint proxy are valid; in response thereto, determining communications connection properties for the communications connection between the source host and the residential endpoint proxy; transmitting the communications connection properties for the communications connection between the source host and the residential endpoint proxy to the residential endpoint proxy to cause the residential endpoint proxy to apply the communications connection properties to the communications connection between the source host and the residential endpoint proxy, and transmit, to the destination host, a user request to connect to the destination host.

24 Claims, 8 Drawing Sheets

(58) Field of Classification Search
CPC ............... H04L 63/029; H04L 63/0823; H04L 61/4511; H04L 63/0227; H04L 63/1408; H04L 63/1425; H04L 69/22; H04L 63/0442; H04L 63/083; H04L 2101/659; H04L 2101/668; H04L 43/08; H04L 61/00; H04L 61/2514; H04L 61/2575; H04L 61/5014; H04L 63/0236; H04L 63/0807; H04L 63/0846; H04L 63/0884; H04L 63/107; H04L 63/1441; H04L 67/104; H04L 67/14; H04L 9/0838

See application file for complete search history.

(56) References Cited

U.S. PATENT DOCUMENTS

| | | | |
|---|---|---|---|
| 2011/0055862 A1* | 3/2011 | Harp | H04N 21/42202 |
| | | | 725/116 |
| 2012/0084349 A1* | 4/2012 | Lee | H04L 67/025 |
| | | | 709/203 |
| 2012/0275349 A1* | 11/2012 | Boyer | H04L 12/1822 |
| | | | 370/261 |
| 2017/0317981 A1* | 11/2017 | Klein | H04L 63/0281 |
| 2017/0331688 A1* | 11/2017 | Mestanov | H04L 63/20 |
| 2021/0160249 A1* | 5/2021 | Deninno | G06F 21/552 |
| 2022/0100808 A1* | 3/2022 | Juravicius | G06F 16/951 |

\* cited by examiner

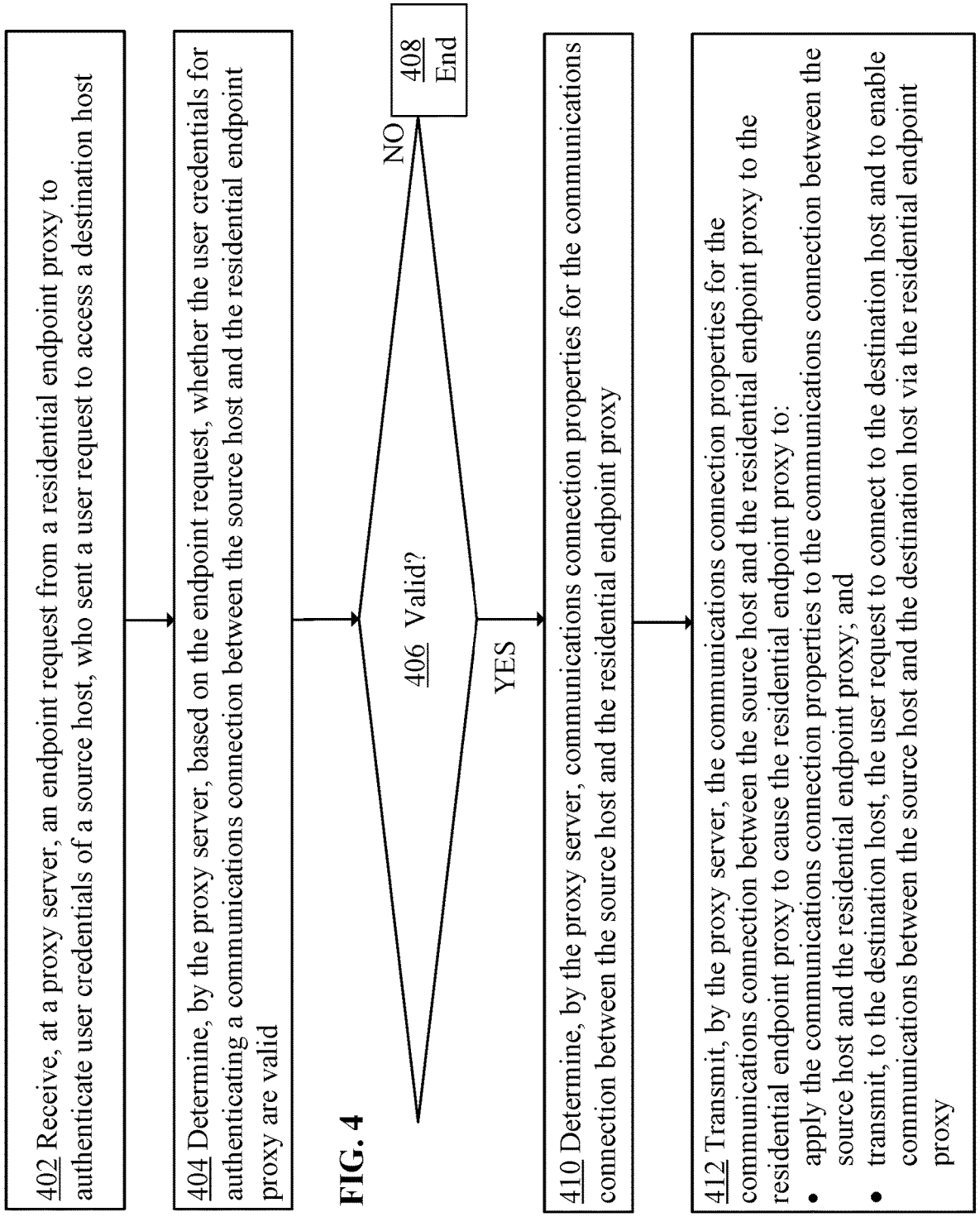

PROXY DIRECT CONNECT

TECHNICAL FIELD

The present disclosure relates to computer networking. More specifically, some embodiments of the present disclosure relate to using a first proxy to confirm a user's credentials to a second proxy to allow the second proxy to facilitate a direct connection between a source host via the second proxy to a destination computer but bypassing the first proxy.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A proxy server is a computer server that is usually implemented as an intermediary between a source host (used by a user) and a destination host (implementing a website, a data center, and the like). The proxy server may execute the HTTP, SOCKS5, or other communications protocols. The proxy server usually receives a request from the source host indicating that the user requests access to the services from the destination host. The destination host may be identified by, for example, an address (e.g., an IP address or a hostname) and a port.

Typically, a user transmits, from a source host, a request to a proxy server to initiate a TCP connection between the source host and the proxy server, and to access a destination host. If the proxy server implements the HTTP/SOCKS5 protocol, then the request may be an HTTP request or a SOCKS5 request and may identify the destination host by a destination domain name and a destination port (e.g., default 443 for HTTPS or 80 for HTTP).

Upon receiving the request from the source host (or preemptively prior to it), the proxy server establishes a TCP communications connection between the proxy server and the destination host, and a TCP communications connection between the proxy server and the source host. Then, the source host starts communicating with the destination host via two concatenated communications connections: the TCP connection between the source host and the proxy server, and the TCP connection between the proxy server and the destination host. The source host and the destination host continue communicating with each other until the corresponding TCP communications connections are terminated.

While the above example refers to only one proxy server, typical configurations may include many proxy servers implemented in various proxy networks, and each proxy network may include one or more proxy endpoints. For example, a user may connect from a source host to, for example, a first proxy server; then, the first proxy server may connect to a second proxy server; and the second proxy server may connect to, for example, a destination host. Examples of proxies implemented in different networks are depicted in FIG. 1A-1B, described in detail later.

Referring briefly to FIG. 1A-1B, one proxy server may serve as an HTTP and/or SOCKS5 proxy server (e.g., a Webshare™ proxy server), while another proxy server may serve as, for example, a residential endpoint TCP proxy. A source host, a proxy server, a residential endpoint proxy, and a destination host are described in detail later.

A residential endpoint proxy may be implemented, for example, inside a home network (i.e., behind the Network Address Translation (NAT) reach), while a proxy server and a source host may be implemented in other computer networks. Therefore, establishing a direct communications connection between the source host and a destination host usually includes connecting the source host to the proxy server in one network, connecting the proxy server to the residential endpoint proxy in another network, and connecting the residential endpoint proxy to the destination host in yet another network.

Establishing a communications connection from a source host via a proxy server and a residential endpoint proxy, and then to a destination host is usually complex and time-consuming. It may include the following: (1) a residential endpoint preemptively creates a connection to the proxy server, (2) a user generates and transmits a request from a source host to the proxy server to connect to a destination host, (3) the proxy server authenticates the user with the authentication credentials (e.g., a username and a password), (4) assuming that the credentials are valid, the proxy server determines and applies connection properties to the connection with the source host, (5) the proxy server selects the already established preemptive connection between the residential endpoint and the proxy server, (6) the proxy server transmits the request (received from the user) to the residential endpoint proxy, and (7) the residential endpoint forwards the received request to the destination host and establishes a connection to the destination host so that the source host can finally communicate with the destination host.

However, the above described process has many implementation problems. For example, it introduces a significant latency and decreases the overall network speed because a direct path between a source host and a destination host includes at least two proxies and connecting and communicating via a couple of proxies along the direct path is time consuming. For example, if a user wishes to upload a 100 MB document to a destination host, then three separate connections need to be established, and the 100 MB traffic needs to be transmitted from the source host to the proxy server, which has to forward the 100 MB traffic to the residential endpoint proxy, which has to forward the 100 MB traffic to the destination host.

Therefore, there is a need to develop an approach that reduces the latency in establishing communications connections linking a source host with a destination host across different networks, reduces the number of proxy endpoints implemented in the direct path between the source host and the destination host, and increases the overall network speed in transmitting data from the source host to the destination host.

BRIEF DESCRIPTION OF THE DRAWINGS

Some embodiments of the present approach are illustrated by way of example, and not in way by limitation, in the figures of the accompanying drawings and in which like reference numerals refers to similar elements and in which:

FIG. 4 is a flow chart depicting an example implementation of a process for establishing a proxy direct connection according to some embodiments.

DETAILED DESCRIPTION

Figure 1A:
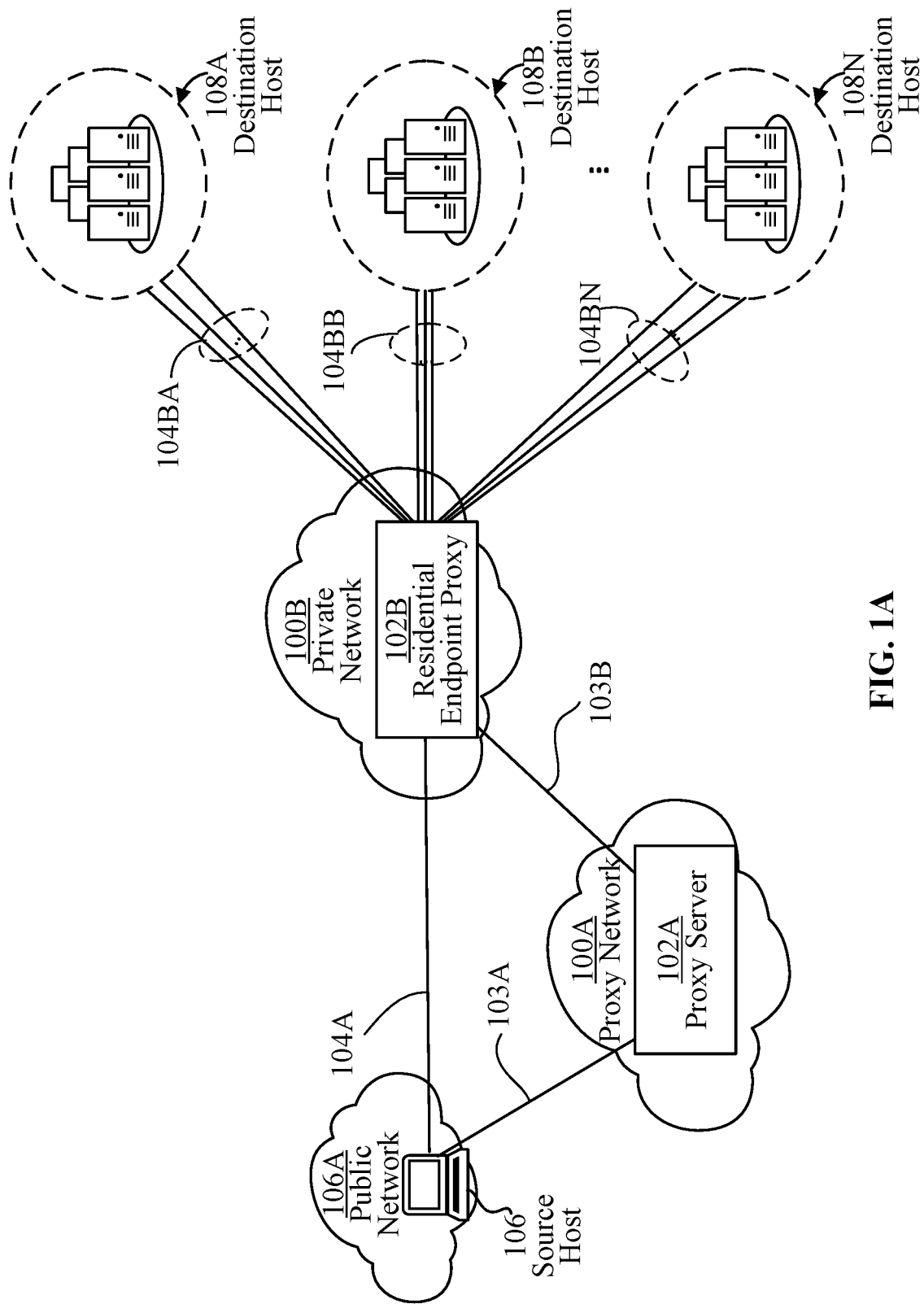
FIG. 1A is a diagram depicting an example proxy network in which some embodiments are implemented.

In the following description, for the purposes of explanation, numerous specific details are set forth in order to provide a thorough understanding of some embodiments of the present approach. It will be apparent, however, that some embodiments may be practiced without these specific details. In other instances, well-known structures and devices are shown in block diagram form in order to avoid unnecessarily obscuring some embodiments.

The detailed description is organized below according to the following outline:
1.0. OVERVIEW
  1.1. INTRODUCTION
  1.2. PROCESS OVERVIEW
2.0. PROXY NETWORKS
  2.1. FUNCTIONALITIES OF PROXY NETWORKS
  2.2. EXAMPLE PROXY NETWORK
3.0. ESTABLISHING TCP CONNECTIONS
4.0. PROXY DIRECT CONNECT USING A PROXY BYPASS
  4.1. OVERVIEW
  4.2. UPNP PROCESS
  4.3. PROXY BYPASS
  4.4. FLOW CHART FOR ESTABLISHING A PROXY DIRECT CONNECTION
  4.5. FLOW CHART FOR CONFIRMING USER CREDENTIALS
5.0. HARDWARE IMPLEMENTATION
6.0. GENERAL CONSIDERATIONS 1.0. Overview 1.1. Introduction In some implementations, a method for enabling a proxy direct connection between a source host configured in one network, a residential endpoint proxy configured in another network, and a destination host configured in yet another network is disclosed. One of the benefits of the method presented herein is that it allows to overcome the difficulties, complexity, and timing demands in establishing a communications connection between the source host and the destination host via the residential endpoint proxy.

The approach is particularly useful in situations when a source host is configured in a public network and a residential endpoint proxy is configured in a private network, or when the source host and the residential endpoint proxy are configured in different public networks. In such configurations, the present method uses the mechanisms for speeding up the time-consuming and cumbersome process of authenticating the source host.

According to the present approach, a proxy server (which is separate from a residential endpoint proxy) provides authentication services of a source host to the residential endpoint proxy. More specifically, in response to receiving an authentication request to authenticate the credentials of a user of the source host, the proxy server authenticates the user credentials, notifies the residential endpoint about the authentication results, and if the credentials are valid, provides connection properties to the residential endpoint proxy for the residential endpoint proxy to use the connection properties to establish a connection with the source host.

Therefore, the disclosed approach allows reducing the latency in establishing a direct connection between a source host and a destination host via a residential endpoint by bypassing a proxy server. More specifically, the approach allows the residential endpoint to establish a proxy direct connection between the source host, the residential endpoint, and the destination host, and not via the proxy server. Furthermore, the disclosed approach allows increasing the overall network speed by reducing the number of proxy endpoints that are in the direct path between the source host and the destination host.

1.2. Process Overview

In the present approach, a residential endpoint proxy may be part of a public network, or part of a private network. If the residential endpoint proxy is part of a public network, then the residential endpoint proxy has assigned a publicly accessible IP address. However, if the residential endpoint proxy is part of a private network, then the residential endpoint proxy is configured to forward a port in a publicly accessible IP address either manually or using a Universal Plug and Play (UPnP) technology. The UPnP technology is described later.

Throughout the description herein, it is assumed that a proxy server is separate from a residential endpoint proxy. Both proxies are described in detail in FIG. 1A-1B.

A proxy direct communications connection is a communications connection established between a source host via a residential endpoint proxy and a destination host. The connection, however, does not include a proxy server. The approach presented herein is referred to as a proxy direct connect approach because the communications connection is established directly between the source host, the residential endpoint proxy, and the destination host. Furthermore, the approach is referred to as a proxy direct connect approach with a proxy bypass because the communications connection bypasses the proxy server, i.e., it does not include the proxy server.

In some implementations, a computer-implemented method comprises receiving, by a proxy server from a residential endpoint proxy, an endpoint request to confirm user credentials for authenticating a communications connection between a source host and the residential endpoint proxy.

In the presented approach, a proxy server is used to confirm user credentials to a residential endpoint proxy and not to facilitate data transmission between a source host and a destination host. The proxy server confirms the user credentials for authenticating the communications connection to enable the source host to directly connect to the residential endpoint proxy. By enabling a direct connection between the source host and the residential endpoint proxy, the latency in establishing a connection between the source host, the residential endpoint proxy, and then the destination host is greatly reduced. Furthermore, by enabling the direct connection, an overall speed of communications exchanged between the source host and the destination host may be increased because the number of proxy endpoints that are in a direct path between the source host and the destination host is decreased.

The endpoint request received by the proxy server from the residential endpoint proxy, may include various types of information identifying the source host. For example, in some implementations, the endpoint request comprises a username and a user password. In some other implementations, the endpoint request comprises an IP address of the source host. In yet other implementations, the endpoint request comprises a username and a user password and an IP address of the source host. Other types of endpoint requests may also be implemented.

Usually, the proxy server receives the endpoint request to confirm the user credentials for authenticating the communications connection when certain conditions are met, i.e., after the residential endpoint proxy preemptively established a communications connection with the proxy server, and after the source host sent a user request to the residential endpoint proxy to access resources of a destination host.

The method further comprises determining, by the proxy server, based on the endpoint request, whether the user credentials for authenticating a communications connection between a source host and the residential endpoint proxy are correct. The process for determining whether the user credentials are correct is described in detail later.

The method also comprises, determining, in response to confirming that the user credentials are correct, communications connection properties for the communications connection between the source host and the residential endpoint proxy. Examples of communications connection properties may include a maximum connection speed, a maximum of concurrent connections, an indication whether a user is authorized to connect to the destination server, and the like.

The method also comprises transmitting to the residential endpoint proxy the communications connection properties for the communications connection between the source host and the residential endpoint proxy.

Upon receiving the communications connection properties, the residential endpoint proxy can apply the communications connection properties to the communications connection between the residential endpoint proxy and the source host.

Furthermore, the residential endpoint proxy can transmit, to the destination host, the user request to connect to the destination host to enable communications between the source host and the destination host via the residential endpoint proxy.

2.0. Proxy Networks

Proxy servers may be implemented as networks of proxy servers. A proxy server network may integrate, for example, a Web proxy server configured to handle Hypertext Transfer Protocol (HTTP) requests received from source hosts, transmit the HTTP requests to destination hosts, receive HTTP responses from the destination hosts, and communicate the HTTP responses to the source hosts. The proxy server network may also integrate Virtual Private Network (VPN) proxy servers that are configured to handle VPN-based requests and responses. Other types of proxy server networks may also be integrated in the proxy server networks.

2.1. Functionalities of Proxy Networks

The computer hardware and software are presented herein for purposes of illustrating the basic underlying components that may be employed in a proxy network. The present approach, however, is not limited to any particular proxy network configuration. The present approach may be implemented in any type of proxy network capable of supporting the methodologies of the described embodiments.

Typically, a proxy server acts on behalf of a source host and facilitates communications between the source host and a destination host. The proxy server is usually configured as an intermediary between the source host and the destination host to implement security measures and to act as a shield between the source host and the destination host. Having the proxy as the intermediary allows preventing the source host and the destination host from being aware of each other network addresses.

A proxy may implement the shield-functionalities by configuring on the proxy a network address translation functionalities and a multi-hop routing functionalities for a proper routing of the requests and responses exchanged between the source and the destination.

Functionalities of a proxy server acting as an intermediary may be implemented in a variety of ways. According to one approach, the proxy may hide a network address of a source host from a destination host and hide a network address of the destination host from the source host.

Typically, a network address of a computer implemented in a computer network is defined as an identifier of the computer, and may be included in, for example, headers of the communications transmitted to and from the computer. Examples of communications protocols used to route the communications between the computers include the Internet Protocol (IP), the Transmission Control Protocol (TCP), the Hypertext Transfer Protocol (HTTP), the Voice over IP (VoIP) protocol, and the like.

Once a communications connection between a source host and a proxy server and a communications connection between the proxy server and a destination host are established, the two communications connections may be "concatenated" and used as a virtual communications link between the source host and the destination host. The virtual link effectively spans the communications connection between the source host and the proxy server and the communications connection between the proxy server and the destination host.

Typically, a TCP proxy, implemented using the SOCKS protocol or the HTTP protocol, connects two TCP communications connections between a source host and a destination host. The TCP proxy can be used to forward data between the source host and the destination host without revealing an IP address of the source host to the destination host and without revealing an IP address of the destination host to the source host. To implement that, the proxy uses its own assigned pool of IP addresses that the proxy may use to mask actual IP addresses of other computers. For example, the proxy may mask the IP addresses of source hosts and the IP addresses of destination hosts by assigning the proxy's own IP addresses to the source hosts and to the destination hosts.

2.2. Example Proxy Network

Figure 1B:
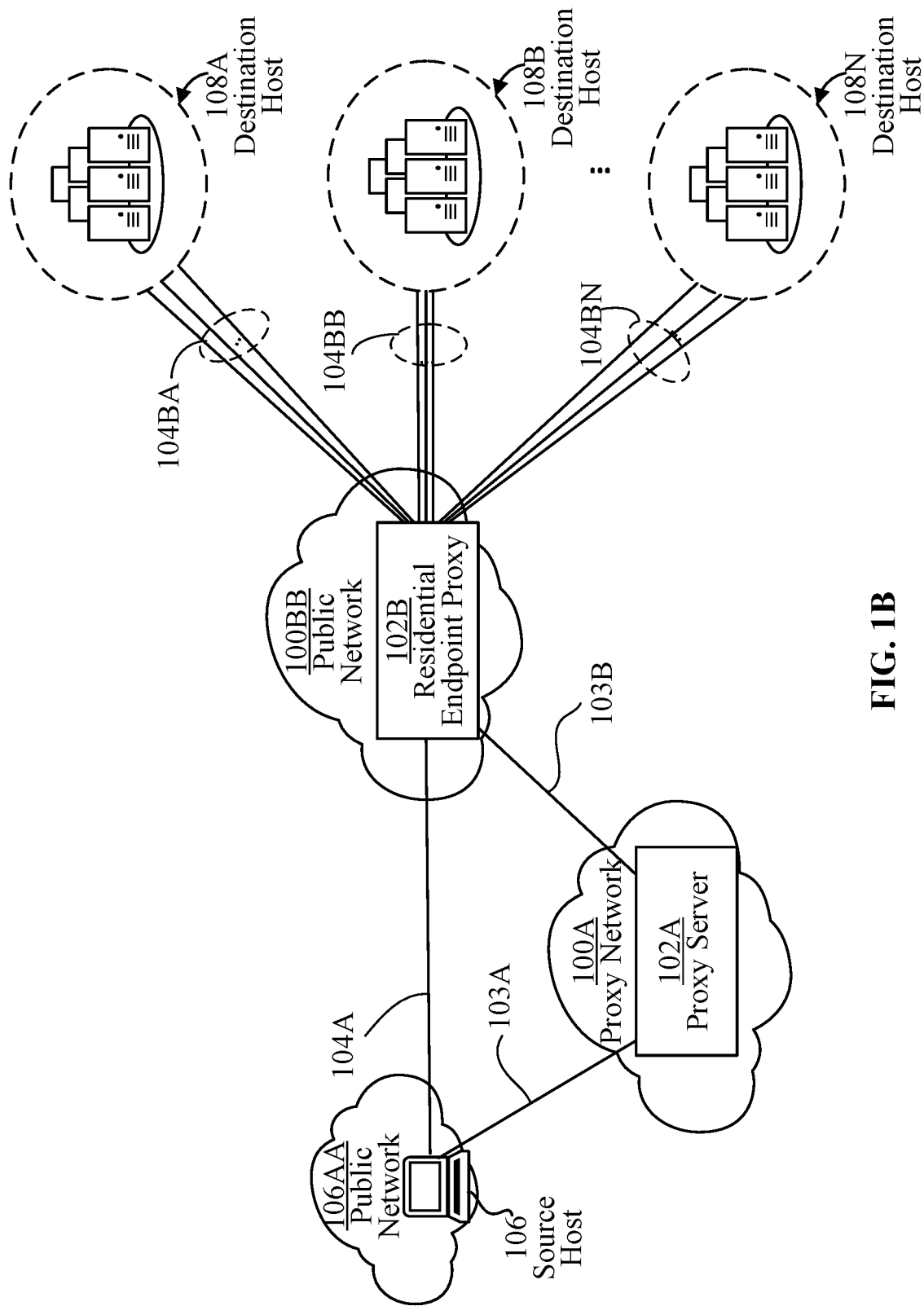
FIG. 1B is a diagram depicting an example proxy network in which some embodiments are implemented.

FIG. 1A-1B are diagrams depicting example proxy networks in which some embodiments are implemented. FIG. 1A-1B, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

As shown in FIG. 1A-1B, proxy networks comprise a proxy network 100A and a proxy network 100B. Proxy network 100A includes one or more proxy servers 102A. Proxy network 100B includes one or more proxy servers 102B.

In FIG. 1A-1B, the lines between the various components represent the network connections established by the proxies. The network connections may be established in conformance with the HTTP protocol, the SOCKS protocol, and the like. The types of the communications connections are not to be viewed as limiting the present approach.

Proxy network 100A may be operated by a proxy service provider. For example, the proxy service provider may be a datacenter proxy service provider or a residential proxy service provider. Proxy network 100A may encompass many proxy endpoints in datacenters around the world. A purpose of the proxy provider is to allow users to access destination hosts using network addresses registered in different networks, countries, or jurisdictions. This is useful to circumvent network firewall restrictions that prevent access to destination hosts by source hosts that have source network addresses registered in restricted computer networks and/or geographic areas.

Proxy network 100B includes one or more residential endpoint proxies 102B and facilitates communications between a source host 106, implemented in a computer network 106A) and a plurality of destination hosts 108A, 108B . . . , 108N, each of which may host, for example, a datacenter, a website, and the like. A residential endpoint may implement an application that runs on an operating system such as Android, iOS, Linux, Windows, tvOS and/or Google TV.

For the purposes of providing a clear example, each of FIG. 1A-1B depicts only a single source host 106 communicating with one or more destination hosts 108A-B-N. However, network 106A may comprise many source hosts. Thus, source host 106 is intended to be viewed as a representative of many source hosts, and destinations 108A-B-N are intended to be viewed as representative of many destination hosts.

In some embodiments, source host 106 is an end-user personal computing device such as laptop computer, a desktop computer, a workstation computer, a tablet computing device, or a portable electronic computing device such as a smartphone. Source host 106 could also be an application server computer or a network computing device and does not need to be an end-user personal computing device.

Each of destination hosts 108A-108N may be an application server computer or a network computing device configured to implement a website or other online services in conjunction with other destination hosts. More generally, any type of computing device or network device may be configured to implement destination hosts 108A-108N.

Each of the computers implementing source host 106, proxy 102A, residential endpoint proxy 102B, or destination hosts 108A-108N may have assigned a registered network address. The registered network addresses may be assigned by a regional Internet registry such as the African Network Information Center (AFRINIC), the American Registry for Internet Numbers (ARIN), the Asia-Pacific Network Information Centre (APNIC), the Latin America and Caribbean Network Information Centre (LACNIC), and the Réseaux IP Européens Network Coordination Centre (RIPE NCC). Network address geolocation databases and services exist for resolving a given network address to the geographic region in which it is registered.

Each of destination hosts 108A-108N may be part of a website that uses a network firewall to restrict access to the website to only source network addresses registered in, for example, the United States. In that case, if source host 106 uses a network address registered in a European country, then source host 106 may not directly connect to each of destination hosts 108A-108N. The network firewall would prevent the direct network connection because the source network address of the network connection is not registered in the United States. This problem may be solved using, for example, proxy network 100B because source host 106 may access the website using proxy network 100A.

As described later, with the help of proxy server 102A, source host 106 may access each of destination hosts 108A-108N using proxy network 100B by establishing a communications connection with an endpoint of residential endpoint proxy 102B. More specifically, residential endpoint proxy 102B can use the help from proxy server 102A to create a secure network connection with source host 106.

The present method utilizes proxy server 102A, which is separate from residential endpoint proxy 102B, to aid residential endpoint proxy 102B in establishing a proxy direct connection between source host 106 and a destination host. Indeed, according to the present approach, proxy server 100A does not facilitate data communications between source host 106 and destination hosts 108A, 108B . . . , 108N. Instead, proxy server 100A provides credential authentication services to residential endpoint proxy 102B, as described later.

Generally, to request services available from, for example, destination host 108B, source host 106 may specify a domain name, website name or other network address of a website of destination host 108B with which a user of source host 106 wants to interact. In addition, source host 106 may specify a target geographic area which may be a continent, country, city, region or state, or postal code.

At a high level of abstraction, residential endpoint proxy 102B receives a request from a user of source host 106 to access, for example, destination host 108B. Based on the request, residential endpoint proxy 102B determines a destination host with which source host 106 wants to communicate.

Suppose that source host 106 requested services from destination host 108B. In this example, residential endpoint proxy 102B can determine an IP address (of a plurality of IP addresses of residential endpoint proxy 102B) that residential endpoint proxy 102B can use to connect to destination host 108B. Furthermore, residential endpoint proxy 102B can determine an IP address (of a plurality of IP addresses of destination host 108B) that residential endpoint proxy 102B can use to connect to destination host 108B. Moreover, residential endpoint proxy 102B can determine a port identifier (of a port of a plurality of ports configured on destination host 108B) that residential endpoint proxy 102B can use to connect to destination host 108B. Based on that information, residential endpoint proxy 102B can establish a connection 104BB. Similar connections may be established between residential endpoint proxy 102B and any of destination hosts 108A, . . . 108N. These connections may be preemptively established in advance.

However, to establish a communications connection between source host 106 and residential endpoint proxy 102B, residential endpoint proxy 102B needs to know user credentials of the source host 106.

In some implementations, when residential endpoint proxy 102B and source host 106 are, for example, in different networks, residential endpoint proxy 102B cannot verify user credentials of source host 106. For example, in FIG. 1A, residential endpoint proxy 102B is implemented in a private network 100B, while source host 106 is implemented in public network 106A. Therefore, residential endpoint proxy 102B is out of reach of the NAT, and residential endpoint proxy 102B is unable to directly authenticate the credentials of source host 106. According to another example, in FIG. 1B, residential endpoint proxy 102B is implemented in a public network 100BB, while source host 106 is implemented in a different public network 106AA. Therefore, residential endpoint proxy 102B is out of reach of the NAT, and residential endpoint proxy 102B is unable to directly authenticate the credentials of source host 106.

However, according to the present approach, proxy server 102A can aid residential endpoint proxy 102B when residential endpoint proxy 102B cannot itself authenticate the credentials of source host 106. Because proxy server 102A is usually within reach of the NAT, and because proxy server 102A can establish communications connections with source host 106, proxy server 102A may authenticate the credentials of source host 106.

If proxy 102A implements, for example the SOCKS protocol, then a SOCKS proxy endpoint of proxy 102A initiates a network connection between proxy server 102A and source host 106, as indicated using a link 103A. During that process, proxy server 102A may acquire authentication credentials of source host 106, and later use the authentication credentials to aid residential endpoint proxy 102B, as described later.

3.0. Establishing TCP Connections

Typically, an active communications connection, of a plurality of active communications connections, has a connection type. The active communications connection, having the connection type, may be defined by at least: an IP address of a plurality of IP addresses of the proxy server, an IP address of a plurality of IP addresses of a certain destination host of a plurality of destination hosts, and a port identifier of a port of a plurality of ports configured on the certain destination host.

A particular communications connection, of the one or more particular communications connections having the particular connection type, may be defined by at least: a particular IP address of the proxy server, a particular IP address of a particular destination host of the plurality of destination hosts, and a particular port identifier of a particular port of a plurality of ports configured on the particular destination host.

In some implementations, proxy server 102A preemptively establishes a plurality of active communications connections that are active within the time period with residential endpoint proxy 102B. Furthermore, residential endpoint proxy server 102B preemptively establishes a plurality of active communications connections that are active within the time period with each of destination 108A-B-N. Then, residential endpoint proxy server 102B establishes a communications connection with source host 106. The last two connections are described below.

A TCP communications connection may be established using, for example, a three-way-handshake process.

Figure 2:
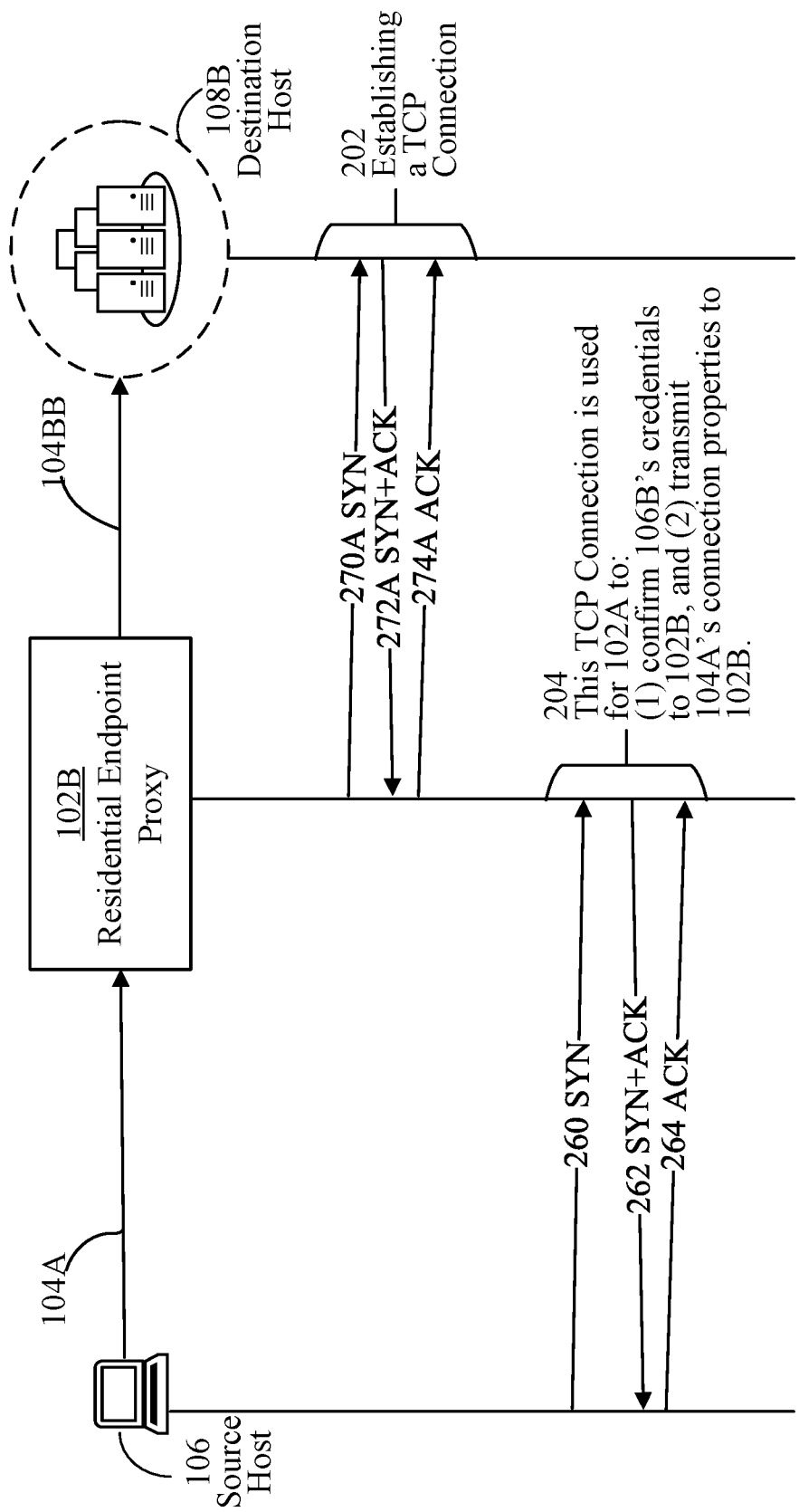
FIG. 2 is a diagram depicting an example process for establishing a communications connection between a residential endpoint proxy and a destination host and establishing a communications connection between a source host and the residential endpoint proxy according to some embodiments.

FIG. 2 is a diagram depicting an example process for establishing a communications connection between a residential endpoint proxy and a destination host and establishing a communications connection between a source host and the residential endpoint proxy according to some embodiments.

In FIG. 2, residential endpoint proxy 102B preemptively establishes a plurality of communications connection from residential endpoint proxy 102B to destination host 108B. A preemptive connection is a connection established in advance, i.e., prior to, for example, receiving a request from source host 106 to connect to destination 102B. Preemptive TCP communications connections between residential endpoint proxy 102B and one or more ports of destination host 108B may be established using, for example, a three-way-handshake process for each of the communications connections.

As shown in FIG. 2, to establish a preemptive TCP communications connection 104BB between residential endpoint proxy 102B and, for example, destination host 108B, residential endpoint proxy 102B may initiate a three-way-handshake process with destination host 108B.

Suppose that residential endpoint proxy 102B wants to establish a preemptive TCP 104BB communications connection from an IP address1 (IPAdd1) of residential endpoint proxy 102B to an IP address2 (IPAdd2) of destination host 108B at a port having an identifier 5 (PortID5) of destination host 108B. To establish the TCP communications connection {IPAdd1, IPAdd2, PortID5}, residential endpoint proxy 102B may initiate a three-way-handshake process with destination host 108B.

To initiate (202) the TCP communications connection {IPAdd1, IPAdd2, PortID5}, residential endpoint proxy 102B may transmit a SYN request 270A to destination host 108B. This may be implemented by setting a SYN flag to 1 and sending a message with the SYN flag to destination host 108B.

In response, destination host 108A may reply with a SYN+ACK message 272B to residential endpoint proxy 102B.

After receiving SYN+ACK message 272B from destination host 108A with a flag set to "1," residential endpoint proxy 102B also may also advertise its window size and maximum segment size to proxy 102. After completion of this step, the preemptive TCP connection {IPAdd1, IPAdd2, PortID5} is established between residential endpoint proxy 102B and the port having PortID5 of destination host 108B.

Later, suppose that source host 106 transmitted a SYN request 260 to residential endpoint proxy 102B to indicate that source host 106 wants to connect to destination host 108B. Suppose that source host 106 transmitted a SYN request 260 to residential endpoint proxy 102B to indicate that source host 106 wants to connect to destination host 108B.

However, since residential endpoint proxy 102B and source host 106 are not in the same network (as shown in FIG. 1A-1B), residential endpoint proxy 102B requests that proxy server 102A confirms authentication credentials of source host 106 to residential endpoint proxy 102B. The process of confirming the authentication credentials of source host 106 is described later.

To continue with FIG. 2, suppose that proxy server 102A confirmed/validated (204) the authentication credentials of source host 106 to residential endpoint proxy 102B. In response thereto, residential endpoint proxy 102B replies with a SYN+ACK message 262 to source host 106.

After receiving SYN+ACK 262 from residential endpoint proxy 102B, source host 106 sends an ACK message 264 with a flag set to "1." The source host also advertises (204) its window size and maximum segment size to proxy 102.

After completion of this step, a connection 104A is established from source host 106 residential endpoint proxy 102B.

At this point, residential endpoint proxy 102B completed establishing both 104A and 104BB connections. Therefore, source host 106 and destination host 108B may communicate with each other via a proxy direct connection that spans connection 104A and connection 104BB.

4.0. Proxy Direct Connect Using a Proxy Bypass

4.1. Overview

According to the present approach, proxy server 102A is used to authenticate credentials of source host 106, but it is not in the direct path of any data upload/download between source host 106 and destination host 108B afterward. This configuration is also referred to as a proxy bypass because proxy server 102A is not in the direct path between source host 106 and destination host 108B. In this configuration, source host 106 establishes a communications connection directly with residential endpoint proxy 102B, and residential endpoint proxy 102B establishes a communications connection directly with destination host 108B.

In order for a user of source host 106 to directly connect to residential endpoint proxy 102B, one of the two following requirements needs to be met: (1) "the source host network-the residential endpoint network-the destination host network" is public-public-public; therefore, the residential endpoint has a publicly accessible IP address; or (2) "the source host network-the residential endpoint network-the destination host network" is public-private-public; therefore, the residential endpoint can forward a port ID in a publicly accessible IP address either manually or using the UPnP technology. For the public-private-public, if forwarding UPnP (via UPnP or set up manually) is not present, then a bypass approach may not be implemented.

4.2. UPNP Approach

If a residential endpoint proxy is part of a private network, then, using the present approach, the residential endpoint proxy can be configured to forward a port ID in a publicly accessible IP address either manually or using the UPnP technology.

UPnP is a protocol that allows applications and devices in a computer network to open and close ports automatically. UPnP can allow, for example, to automatically connect a device implemented in one network to a device implemented in another network.

UPnP offers zero-configuration. That means that connecting a device from one network to a device in another network can be performed automatically and without manually configuring the device in another network. UPnP-enabled devices can automatically join other networks, obtain an IP address in other networks, and find and connect to other networks.

UPnP technology is intertwined with the concept of a port forwarding. A port forwarding is used to establish a direct connection between a device or server in one network with a device or server in another network. Without UPnP, devices in one network may not be able to access the devices in another network.

4.3. Proxy Bypass

Figure 3A:
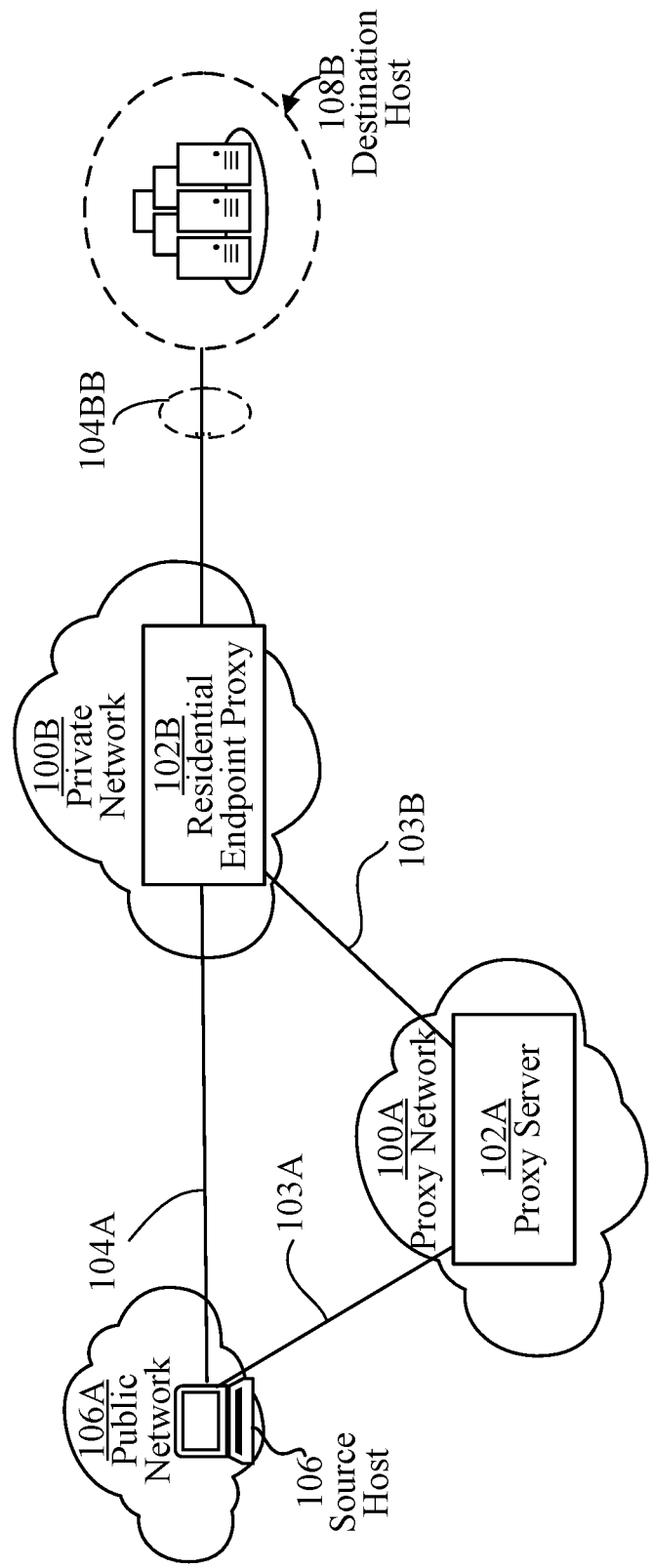
FIG. 3A is a diagram depicting an example proxy direct connection according to some embodiments.
Figure 3B:
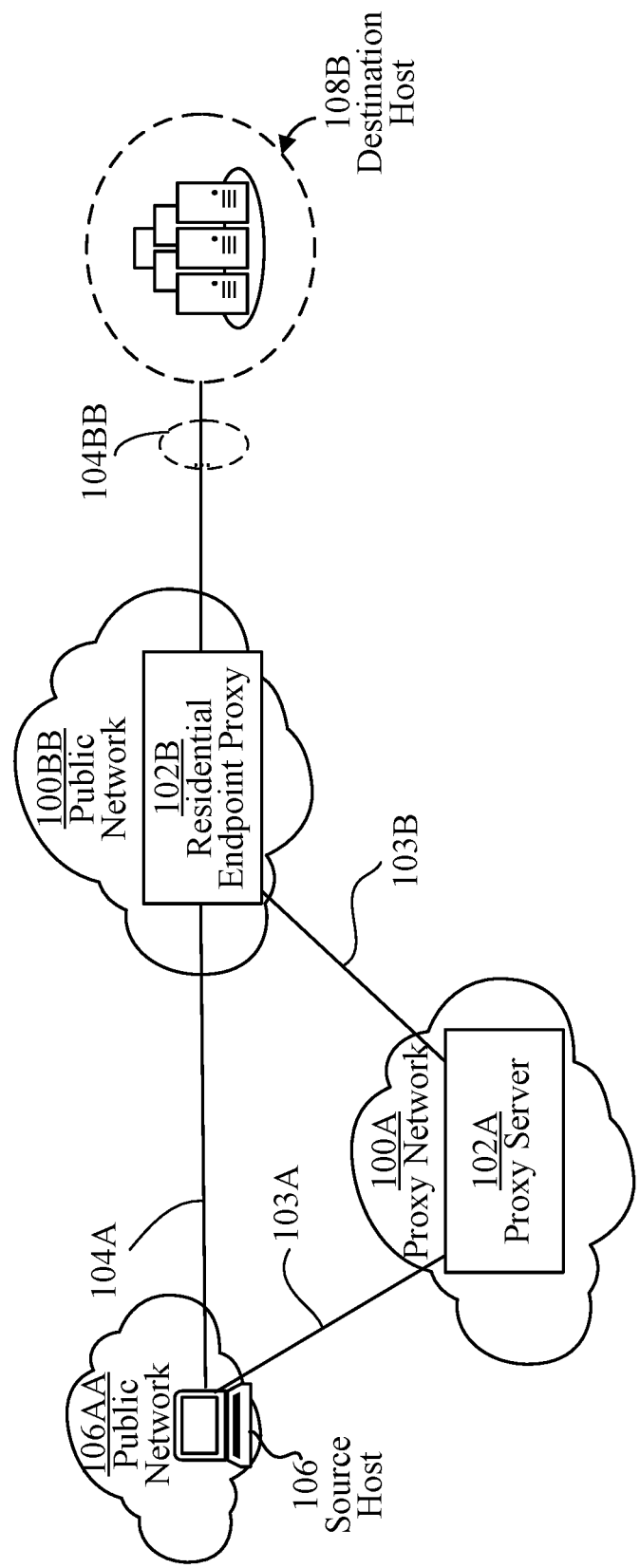
FIG. 3B is a diagram depicting an example proxy direct connection according to some embodiments.
Figure 5:
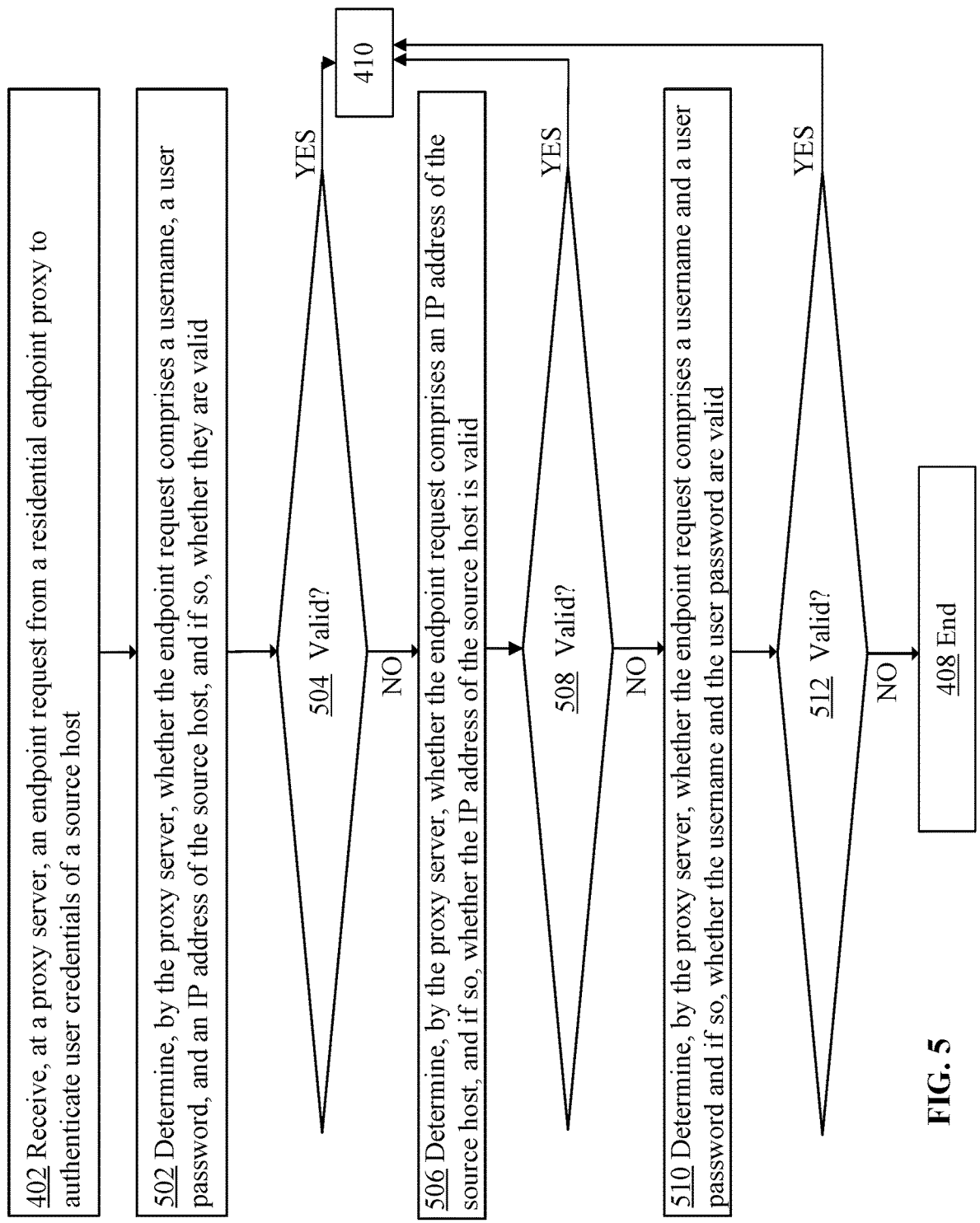
FIG. 5 is a flow chart depicting an example implementation of a process for confirming user credentials according to some embodiments.

FIG. 3A-3B are diagrams depicting example proxy direct connections according to some embodiments. Suppose that source host 106 generated a user request to access resources of destination host 108B and transmitted the request to residential endpoint proxy 102B. The request could be transmitted to residential endpoint proxy 102B via connection 104A, as described earlier.

In response to receiving the user request, suppose that residential endpoint proxy 102B established preemptive connection 104BB with destination host 108B, as described earlier.

Furthermore, suppose that "the source host network-the residential endpoint network-the destination network" is either public-private-public (as in FIG. 3A) or public-public-public (as in FIG. 3B).

To allow source host 106 to connect to destination host 108B directly via residential endpoint proxy 102B, the following steps are performed: (1) source host 106 transmits the request (via 104A) to residential endpoint proxy 102B to indicate that the user wishes to connect to destination host 108B; (2) since residential endpoint proxy 102B cannot validate the user credentials as source host 106 is not in the same network as residential endpoint proxy 102B, residential endpoint proxy 102B forwards (via 103B) the user credentials to proxy server 102A; and (3) proxy server 102A validates/confirms the user credentials received from residential endpoint proxy 102B. Proxy server 102A could receive the information to validate/confirm the user credentials in advance via a communications connection 103A with source host 106, and thus is already in possession of the user credentials.

Assuming that proxy server 102A successfully validated/confirmed the user credentials, proxy server 102A transmits (via 103B) to residential endpoint proxy 102B, an indication that the user credentials are valid. In addition, proxy server 102A transmits (via 103B) connection properties for a communications connection 104A to be established between source host 106 and residential endpoint proxy 102B.

Upon receiving the indication that the user credentials are valid and receiving the connection properties for communications connection 104A with source host 106, residential endpoint proxy 102B applies the connection properties to communications connection 104A and establishes connection 104A between source host 106 and residential endpoint proxy 102B.

Once communications connection 104A between source host 106 and residential endpoint proxy 102B is established, residential endpoint proxy 102B forwards (via previously established connection 104BB) the user request, received from source host 106, to destination host 108B. As described earlier, the user request indicates that source host 106 wishes to access resources of destination host 108B.

Once the destination host accepts the request, residential endpoint proxy 102B allows the user of source host 106 to communicate with destination host 108B.

In the above example, proxy server 102A is used to authenticate user credentials of user/source host 106. However, proxy server 102A is not actually present in the direct path of any data upload/download between source host 106 and destination host 108B afterwards.

4.4. Flow Chart for Establishing a Proxy Direct Connection

FIG. 4 is a flow chart depicting an example implementation of a process for establishing a proxy direct connection according to some embodiments. In the process depicted in FIG. 4, a proxy server is used to confirm the user credentials to a residential endpoint proxy and not to facilitate data transmission between the source host and a destination host. However, the proxy server is used to confirm the user credentials for authenticating a communications connection between source host 106 and residential endpoint proxy 102B to enable source host 106 to directly connect to destination host 108B via residential endpoint proxy 102B.

By enabling a direct connection between source host 106 and residential endpoint proxy 102B and destination host 108B, the latency in establishing the connection is greatly reduced. Furthermore, by enabling the direct connection, an overall speed of communications exchanged between source host 106 and destination host 108B may be increased because a number of proxy endpoints that are in a direct path between source host 106 and destination host 108B is decreased.

In step 402, proxy server 102A receives an endpoint request from residential endpoint proxy 102B to authenticate user credentials of source host 106. The endpoint request may include various types of information identifying source host 106. For example, in some implementations, the endpoint request comprises a username and a user password. In some other implementations, the endpoint request comprises an IP address of the source host. In yet other implementations, the endpoint request comprises a username and a user password and an IP address of the source host. Other types of endpoint requests may also be implemented.

Usually, the proxy server receives the endpoint request to confirm the user credentials for authenticating the communications connection when two conditions are met, i.e., after the residential endpoint proxy preemptively established a communications connection with the proxy server, and after the source host sent a user request to the residential endpoint proxy to access resources of a destination host.

In step 404, the proxy server determines, based on the endpoint request, whether the user credentials for authenticating a communications connection between source host 106 and residential endpoint proxy 102B are valid.

If, in step 406, the proxy server determines that the user credentials are valid, then the proxy server proceeds to step 410. Otherwise, the proxy server proceeds to step 408, in which the proxy server may finish processing the endpoint request received in step 402. Optionally, or in addition to, the proxy server may notify residential endpoint server 102B that the user credentials were invalid.

Assuming that the credentials are valid, in step 410, the proxy server determines communications connection properties for the communications connection between source host 106 and residential endpoint proxy 102B. Examples of communications connection properties may include a maximum connection speed, a maximum of concurrent connections, an indication whether a user is authorized to connect to the destination server, and the like.

In step 412, the proxy server transmits the communications connection properties for the communications connection, between source host 106 and residential endpoint proxy 102B, to residential endpoint proxy 102B.

Upon receiving the communications connection properties, the residential endpoint proxy can apply the communications connection properties to the communications connection between the source host and the residential endpoint proxy.

Furthermore, the residential endpoint proxy can transmit, to the destination host, a user request to connect to the destination host and to enable communications between the source host and the destination host via the direct communications connection bypassing proxy server 102A.

4.6. Flow Chart for Confirming User Credentials

In step 402, proxy server 102A receives an endpoint request from residential endpoint proxy 102B to authenticate user credentials of source host 106. The request may include one or more of: a username, a user password, and an IP address, as described in FIG. 4.

In step 502, the proxy server tests whether the endpoint request comprises a username, a user password, and an IP address of the source host, and if so, whether the username, the user password, and the IP address of the source host are valid.

If, in step 504, the proxy server determined that the endpoint request included the valid username, the valid user password, and the valid IP address, then the proxy server proceeds to step 410, and then to step 412, both described in FIG. 4.

Otherwise, the proxy server tests, in step 506, whether the endpoint request comprises an IP address of the source host, and if so, whether the IP address of the source host is valid.

If, in step 508, the proxy server determined that the endpoint request included the valid IP address of the source host, then the proxy server proceeds to step 410, and then to step 412, both described in FIG. 4.

Otherwise, the proxy server tests, in step 510, whether the endpoint request comprises a username and a user password of a user of source host 106, and if so, whether the username and the user password are valid.

If, in step 512, the proxy server determined that the endpoint request included the valid username and the valid user password, then the proxy server proceeds to step 410, and then to step 412, both described in FIG. 4.

5.0. Hardware Implementation

According to some embodiments of the present approach, the techniques described herein are implemented by at least one computer system. The techniques may be implemented in whole or in part using a combination of at least one server computer or other computer systems that are coupled using a network, such as a packet data network. The computer systems may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a data center, or a network of server computers or personal computers.

Figure 6:
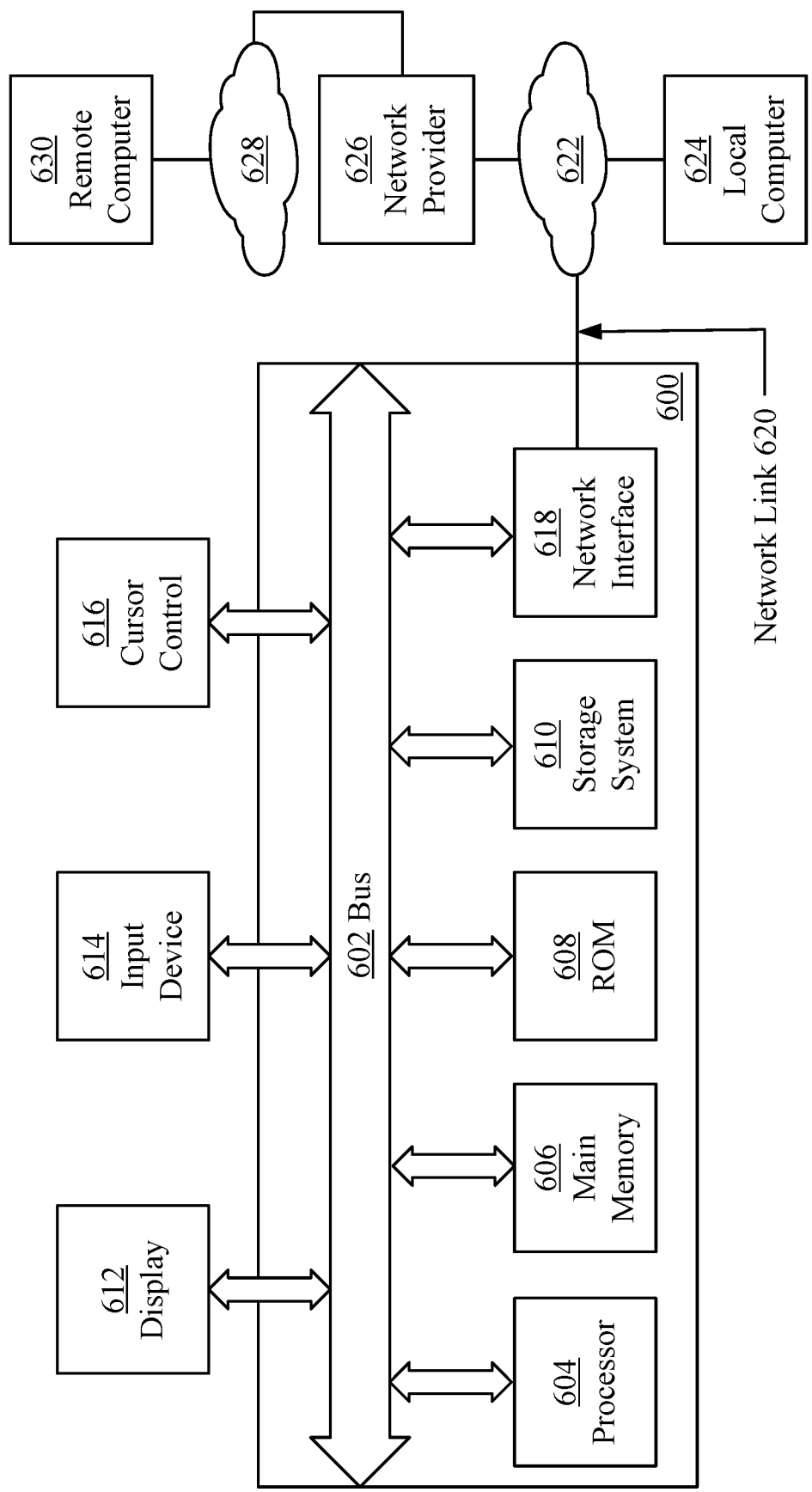
FIG. 6 is a block diagram depicting a computer system upon which some embodiments may be implemented.

FIG. 6 is a block diagram that illustrates an example computer system with which some embodiments may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus or other communication mechanism(s) for communicating information or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 600 may be coupled via I/O subsystem 602 to at least one output device 612. In some embodiments, output device 612 is a digital computer display. Examples of a display that may be used in some embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In some embodiments, computer system 600 may comprise an internet of things (IoT) device in which one or more of the output devices 612, input device 614, and control device 616 are omitted. In some embodiments, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator, or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware or program instructions or logic which when loaded and used or executed in combination with the computer system causes or programs the computer system to operate as a special-purpose machine. According to some embodiments, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In some embodiments, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Communication interface 618 can be based on an interconnect technology used for distributed computing systems, supercomputer systems, and high-performance computing systems. For example, communication interface 618 can be based on OMNI-PATH, INFINIBAND, ARIES, NVLINK, TOFU, or Ethernet.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices or computers that are operated by an Internet Service Provider (ISP) 626. ISP 626 provides data communication services through a world-wide packet data communication network represented as internet 628.

A server computer 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or NoSQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some embodiments, for security and reliability, an operating system may prevent direct communication between independent processes, providing strictly mediated and controlled inter-process communication functionality.

6.0. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for the purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers, or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A proxy server comprising:
one or more computer processors;
storage media; and
instructions stored in the storage media that, when executed by the one or more computer processors, cause the one or more computer processors to perform:
receiving, by a proxy server, from a residential endpoint proxy, an endpoint request to confirm user credentials for authenticating a communications connection between a source host and the residential endpoint proxy;
determining, by the proxy server, based on the endpoint request, whether the user credentials for authenticating a communications connection between a source host and the residential endpoint proxy are valid;
in response to determining that the user credentials are valid, determining communications connection properties for the communications connection between the source host and the residential endpoint proxy, the communications connection properties comprising one or more limits on the communications connection between the source host and the residential endpoint proxy, at least one of the one or more limits comprising a maximum connection speed or a maximum number of concurrent connections;

transmitting the communications connection properties for the communications connection between the source host and the residential endpoint proxy to the residential endpoint proxy to cause:

the residential endpoint proxy to apply the communications connection properties to the communications connection between the source host and the residential endpoint proxy;

the residential endpoint proxy to transmit, to a destination host, a user request to connect to the destination host; and the residential endpoint proxy to establish a proxy direct communications connection between the source host and the destination host via the communications connection and a preemptive communications connection between the residential endpoint proxy and the destination host, wherein the proxy direct communications connection bypasses the proxy server.

2. The proxy server of claim 1, wherein the endpoint request comprises a username and a user password.

3. The proxy server of claim 1, wherein the endpoint request comprises an IP address of the source host.

4. The proxy server of claim 1, wherein the endpoint request comprises a username and a user password and an IP address of the source host.

5. The proxy server of claim 1, wherein the proxy server receives the endpoint request to confirm the user credentials for authenticating the communications connection after the proxy server established a connection with the residential endpoint proxy and after the source host requested to be directly connected to the residential endpoint proxy.

6. The proxy server of claim 1, wherein the residential endpoint proxy has a publicly accessible IP address.

7. The proxy server of claim 1, wherein the residential endpoint proxy is configured to forward a port in a publicly accessible IP address either manually or using an UPnP technology.

8. The proxy server of claim 1, wherein the communications connection is established directly between the source host and the residential endpoint proxy and does not include the proxy server;

wherein the proxy server is used to confirm the user credentials to the residential endpoint proxy and not to facilitate data transmission between the source host and the destination host;

wherein the proxy server confirms the user credentials for authenticating the communications connection to enable the source host to directly connect to the residential endpoint proxy, to reduce latency in establishing a connection between the source host and the destination host, and to increase an overall speed of communications between the source host and the destination host by reducing a number of proxy endpoints that are in a direct path between the source host and the destination host.

9. A computer-implemented method comprising:

receiving, by a proxy server, from a residential endpoint proxy, an endpoint request to confirm user credentials for authenticating a communications connection between a source host and the residential endpoint proxy;

determining, by the proxy server, based on the endpoint request, whether the user credentials for authenticating a communications connection between a source host and the residential endpoint proxy are valid;

in response to determining that the user credentials are valid, determining communications connection properties for the communications connection between the source host and the residential endpoint proxy, the communications connection properties comprising one or more limits on the communications connection between the source host and the residential endpoint proxy, at least one of the one or more limits comprising a maximum connection speed or a maximum number of concurrent connections;

transmitting the communications connection properties for the communications connection between the source host and the residential endpoint proxy to the residential endpoint proxy to cause:

the residential endpoint proxy to apply the communications connection properties to the communications connection between the source host and the residential endpoint proxy;

the residential endpoint proxy to transmit, to a destination host, a user request to connect to the destination host; and the residential endpoint proxy to establish a proxy direct communications connection between the source host and the destination host via the communications connection and a preemptive communications connection between the residential endpoint proxy and the destination host, wherein the proxy direct communications connection bypasses the proxy server.

10. The method of claim 9, wherein the endpoint request comprises a username and a user password.

11. The method of claim 9, wherein the endpoint request comprises an IP address of the source host.

12. The method of claim 9, wherein the endpoint request comprises a username and a user password and an IP address of the source host.

13. The method of claim 9, wherein the proxy server receives the endpoint request to confirm the user credentials for authenticating the communications connection after the proxy server established a connection with the residential endpoint proxy and after the source host requested to be directly connected to the residential endpoint proxy.

14. The method of claim 9, wherein the residential endpoint proxy has a publicly accessible IP address.

15. The method of claim 9, wherein the residential endpoint proxy is configured to forward a port in a publicly accessible IP address either manually or using a UPnP technology.

16. The method of claim 9, wherein the communications connection is established directly between the source host and the residential endpoint proxy and does not include the proxy server;

wherein the proxy server is used to confirm the user credentials to the residential endpoint proxy and not to facilitate data transmission between the source host and the destination host;

wherein the proxy server confirms the user credentials for authenticating the communications connection to enable the source host to directly connect to the residential endpoint proxy, to reduce latency in establishing a connection between the source host and the destination host, and to increase an overall speed of communications between the source host and the destination host by reducing a number of proxy endpoints that are in a direct path between the source host and the destination host.

17. A computer-readable storage media storing one or more instructions which, when executed by one or more processors, cause the one or more processors to perform:
receiving, by a proxy server, from a residential endpoint proxy, an endpoint request to confirm user credentials for authenticating a communications connection between a source host and the residential endpoint proxy;
determining, by the proxy server, based on the endpoint request, whether the user credentials for authenticating a communications connection between a source host and the residential endpoint proxy are valid;
in response to determining that the user credentials are valid, determining communications connection properties for the communications connection between the source host and the residential endpoint proxy, the communications connection properties comprising one or more limits on the communications connection between the source host and the residential endpoint proxy, at least one of the one or more limits comprising a maximum connection speed or a maximum number of concurrent connections;
transmitting the communications connection properties for the communications connection between the source host and the residential endpoint proxy to the residential endpoint proxy to cause:
the residential endpoint proxy to apply the communications connection properties to the communications connection between the source host and the residential endpoint proxy;
the residential endpoint proxy to transmit, to a destination host, a user request to connect to the destination host; and
the residential endpoint proxy to establish a proxy direct communications connection between the source host and the destination host via the communications connection and a preemptive communications connection between the residential endpoint proxy and the destination host, wherein the proxy direct communications connection bypasses the proxy server.

18. The computer-readable storage media of claim 17, wherein the endpoint request comprises a username and a user password.

19. The computer-readable storage media of claim 17, wherein the endpoint request comprises an IP address of the source host.

20. The computer-readable storage media of claim 17, wherein the endpoint request comprises a username and a user password and an IP address of the source host.

21. The computer-readable storage media of claim 17, wherein the proxy server receives the endpoint request to confirm the user credentials for authenticating the communications connection after the proxy server established a connection with the residential endpoint proxy and after the source host requested to be directly connected to the residential endpoint proxy.

22. The computer-readable storage media of claim 17, wherein the residential endpoint proxy has a publicly accessible IP address.

23. The computer-readable storage media of claim 17, wherein the residential endpoint proxy is configured to forward a port in a publicly accessible IP address either manually or using a UPnP technology.

24. The computer-readable storage media of claim 17, wherein the communications connection is established directly between the source host and the residential endpoint proxy and does not include the proxy server;
wherein the proxy server is used to confirm the user credentials to the residential endpoint proxy and not to facilitate data transmission between the source host and the destination host;
wherein the proxy server confirms the user credentials for authenticating the communications connection to enable the source host to directly connect to the residential endpoint proxy, to reduce latency in establishing a connection between the source host and the destination host, and to increase an overall speed of communications between the source host and the destination host by reducing a number of proxy endpoints that are in a direct path between the source host and the destination host.

* * * * *